Sept. 30, 1958   G. R. GAMERTSFELDER   2,854,666
PLANAR MICROWAVE ANTENNA ARRAY
Filed Feb. 3, 1953   5 Sheets-Sheet 1
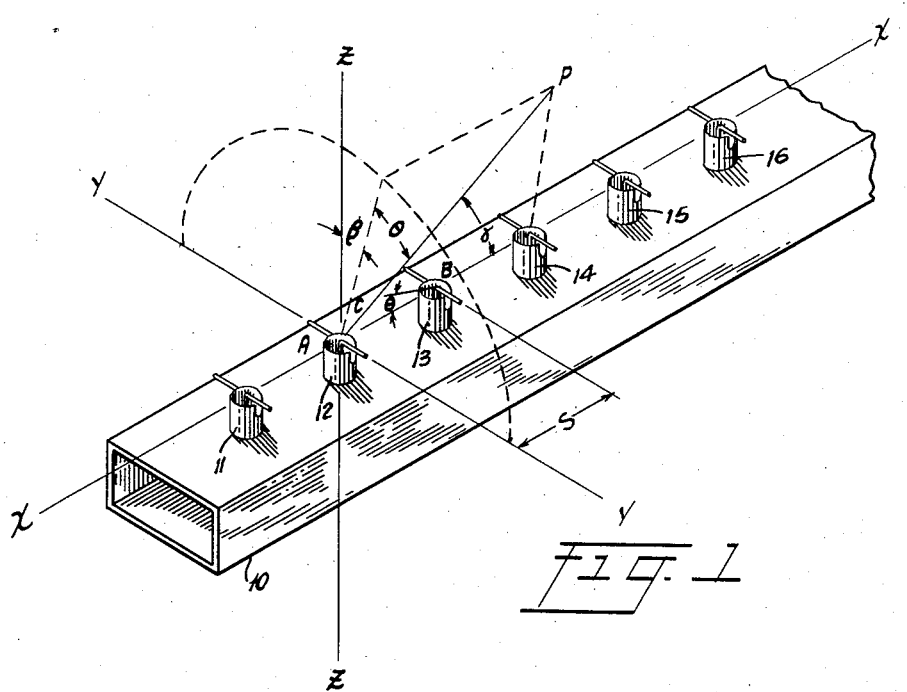
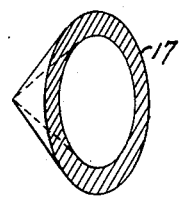
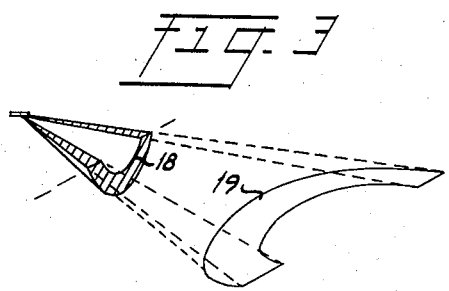
INVENTOR.
GEORGE R. GAMERTSFELDER
BY
ATTORNEY.

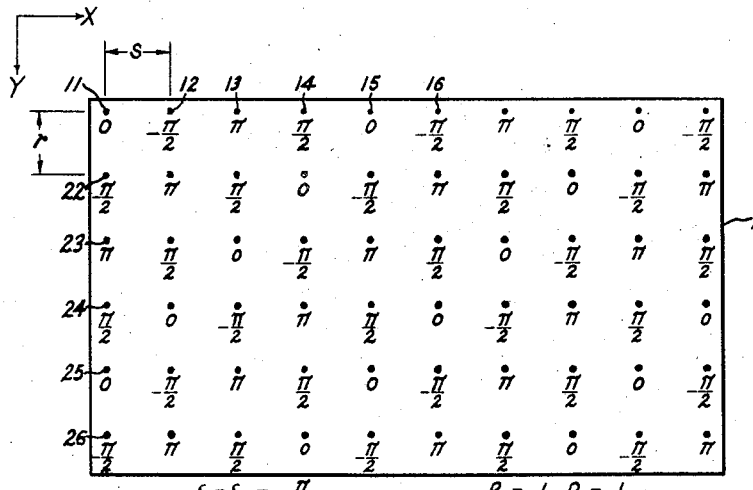

Sept. 30, 1958     G. R. GAMERTSFELDER     2,854,666
PLANAR MICROWAVE ANTENNA ARRAY Filed Feb. 3, 1953     5 Sheets-Sheet 3

INVENTOR.
GEORGE R. GAMERTSFELDER
BY
*H. L. Mackey*
ATTORNEY.

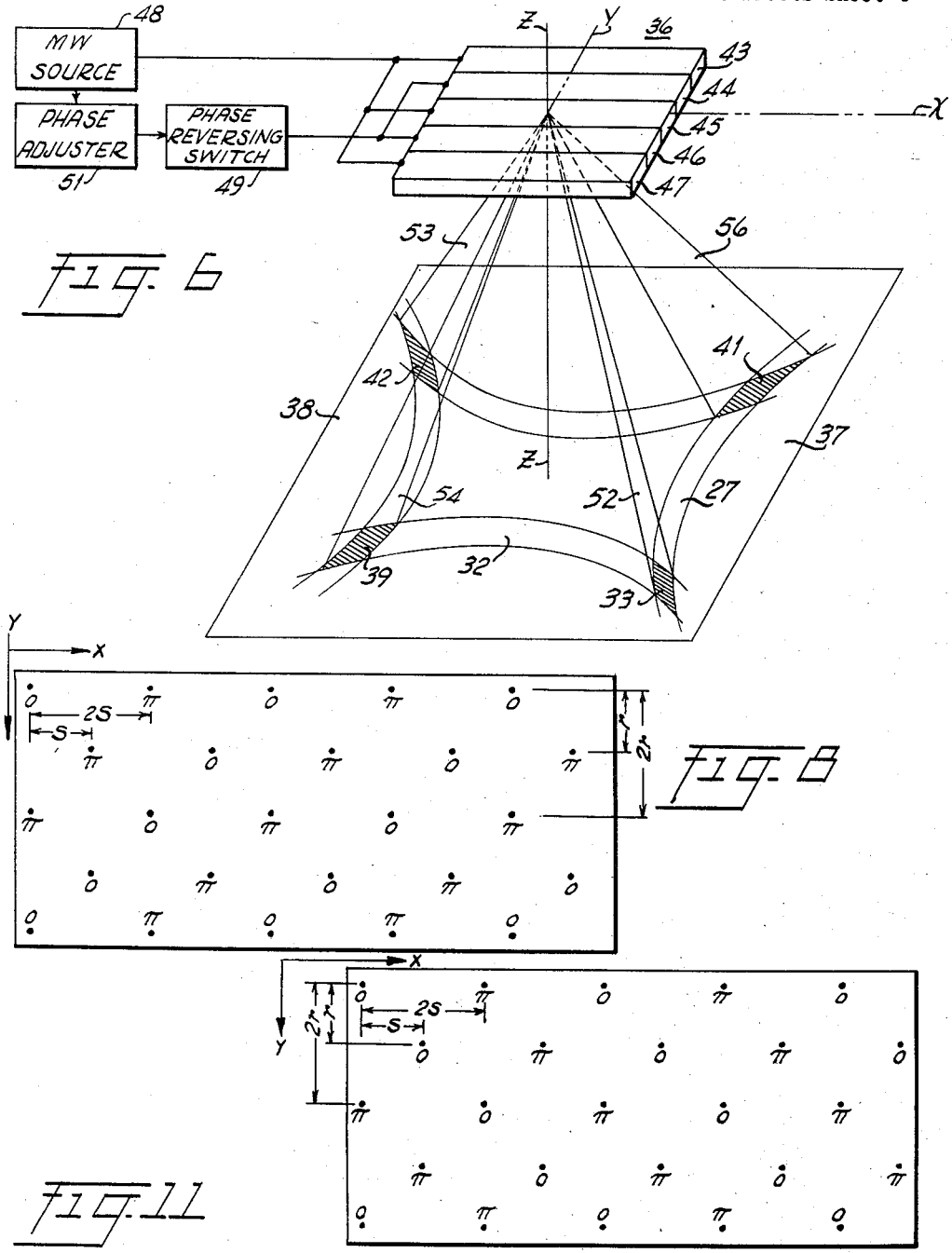

Sept. 30, 1958 G. R. GAMERTSFELDER 2,854,666
PLANAR MICROWAVE ANTENNA ARRAY
Filed Feb. 3, 1953 5 Sheets-Sheet 5

Fig. 9

| $0$ | $\frac{\pi}{2}$ | $\pi$ | $-\frac{\pi}{2}$ | $0$ | $\frac{\pi}{2}$ | $\pi$ | $-\frac{\pi}{2}$ | $0$ | $\frac{\pi}{2}$ |
|---|---|---|---|---|---|---|---|---|---|
| $-\frac{\pi}{2}$ | $0$ | $\frac{\pi}{2}$ | $\pi$ | $-\frac{\pi}{2}$ | $0$ | $\frac{\pi}{2}$ | $\pi$ | $-\frac{\pi}{2}$ | $0$ |
| $\pi$ | $-\frac{\pi}{2}$ | $0$ | $\frac{\pi}{2}$ | $\pi$ | $-\frac{\pi}{2}$ | $0$ | $\frac{\pi}{2}$ | $\pi$ | $-\frac{\pi}{2}$ |
| $\frac{\pi}{2}$ | $\pi$ | $-\frac{\pi}{2}$ | $0$ | $\frac{\pi}{2}$ | $\pi$ | $-\frac{\pi}{2}$ | $0$ | $\frac{\pi}{2}$ | $\pi$ |
| $0$ | $\frac{\pi}{2}$ | $\pi$ | $-\frac{\pi}{2}$ | $0$ | $\frac{\pi}{2}$ | $\pi$ | $-\frac{\pi}{2}$ | $0$ | $\frac{\pi}{2}$ |
| $-\frac{\pi}{2}$ | $0$ | $\frac{\pi}{2}$ | $\pi$ | $-\frac{\pi}{2}$ | $0$ | $\frac{\pi}{2}$ | $\pi$ | $-\frac{\pi}{2}$ | $0$ |

$\delta_x = +\frac{\pi}{2} \quad \delta_y = -\frac{\pi}{2} \quad P_x = +1 \quad P_y = -1$

Fig. 10

| $0$ | $-\frac{\pi}{2}$ | $\pi$ | $\frac{\pi}{2}$ | $0$ | $-\frac{\pi}{2}$ | $\pi$ | $\frac{\pi}{2}$ | $0$ | $-\frac{\pi}{2}$ |
|---|---|---|---|---|---|---|---|---|---|
| $\frac{\pi}{2}$ | $0$ | $-\frac{\pi}{2}$ | $\pi$ | $\frac{\pi}{2}$ | $0$ | $-\frac{\pi}{2}$ | $\pi$ | $\frac{\pi}{2}$ | $0$ |
| $\pi$ | $\frac{\pi}{2}$ | $0$ | $-\frac{\pi}{2}$ | $\pi$ | $\frac{\pi}{2}$ | $0$ | $-\frac{\pi}{2}$ | $\pi$ | $\frac{\pi}{2}$ |
| $-\frac{\pi}{2}$ | $\pi$ | $\frac{\pi}{2}$ | $0$ | $-\frac{\pi}{2}$ | $\pi$ | $\frac{\pi}{2}$ | $0$ | $-\frac{\pi}{2}$ | $\pi$ |
| $0$ | $-\frac{\pi}{2}$ | $\pi$ | $\frac{\pi}{2}$ | $0$ | $-\frac{\pi}{2}$ | $\pi$ | $\frac{\pi}{2}$ | $0$ | $-\frac{\pi}{2}$ |
| $\frac{\pi}{2}$ | $0$ | $-\frac{\pi}{2}$ | $\pi$ | $\frac{\pi}{2}$ | $0$ | $-\frac{\pi}{2}$ | $\pi$ | $\frac{\pi}{2}$ | $0$ |

$\delta_x = -\frac{\pi}{2} \quad \delta_y = +\frac{\pi}{2} \quad P_x = -1 \quad P_y = +1$ INVENTOR.
GEORGE R. GAMERTSFELDER
BY
*H. P. Mackey*
ATTORNEY.

United States Patent Office 2,854,666
Patented Sept. 30, 1958

2,854,666

PLANAR MICROWAVE ANTENNA ARRAY

George R. Gamertsfelder, Pleasantville, N. Y., assignor to General Precision Laboratory Incorporated, a corporation of New York Application February 3, 1953, Serial No. 334,914

6 Claims. (Cl. 343—810)

This invention relates to planar microwave antennas for the radiation of two principal lobes. More specifically the invention relates to rectilinear arrangements of antenna elements in a plane for the production of two principal lobes or beams of microwave radiation, with provision for changing the orientations of the lobes from one position to another position.

In the measurement of airplane speed and drift it has been found advantageous to employ four narrow beams of radiation. It has been found particularly advantageous to employ the beams in oblique pairs, one beam directed downward toward the front and to the right and another downward beam directed rearward and to the left forming one pair, with a beam to the front and left and a beam to the rear and right forming the other pair. It is also found advantageous to excite these pairs alternately, so that during the time that the first pair is excited the second pair is not excited, and vice versa. It is further found advantageous, on reception, to mix or add the signals from the two members of a pair prior to detection.

This invention provides an antenna made of a number of linear arrays placed side by side that simultaneously emits two beams, one directed forward and to one side of a vertical fore-and-aft plane and the other directed to the rear and to the other side, constituting the radiation of a pair of beams as described. Upon reversing the polarity of the microwave energy supply to alternate linear arrays the beams are changed to the alternate directions.

One purpose then of this invention is to provide a planar or two-dimensional microwave antenna array for transmitting two beams simultaneously, the directions of radiation being controlled by control of the phasing of a portion of the microwave energy applied to the antenna array.

A more specific purpose of this invention is to provide a planar antenna array for transmitting two principal lobes at equal angles on opposite sides of the normal, together with phase switching means to reverse the phase of microwave energy applied to alternate rows of antenna elements whereby the projections of the lobe directions onto the plane of the antenna are changed.

A further understanding of this invention may be secured from the detailed description and the drawings, in which:

Figures 1, 2 and 3 illustrate the production of a cone of radiation by a microwave linear array of antenna elements.

Figures 4, 7, 9 and 10 graphically depict the positions and the relative phases of emissions of antenna elements in a planar array to produce a single oblique beam.

Figure 6 illustrates the geometry of multiple spot irradiation and indicates the electronic equipment for excitation of a phase-switched planar array.

Figure 5:
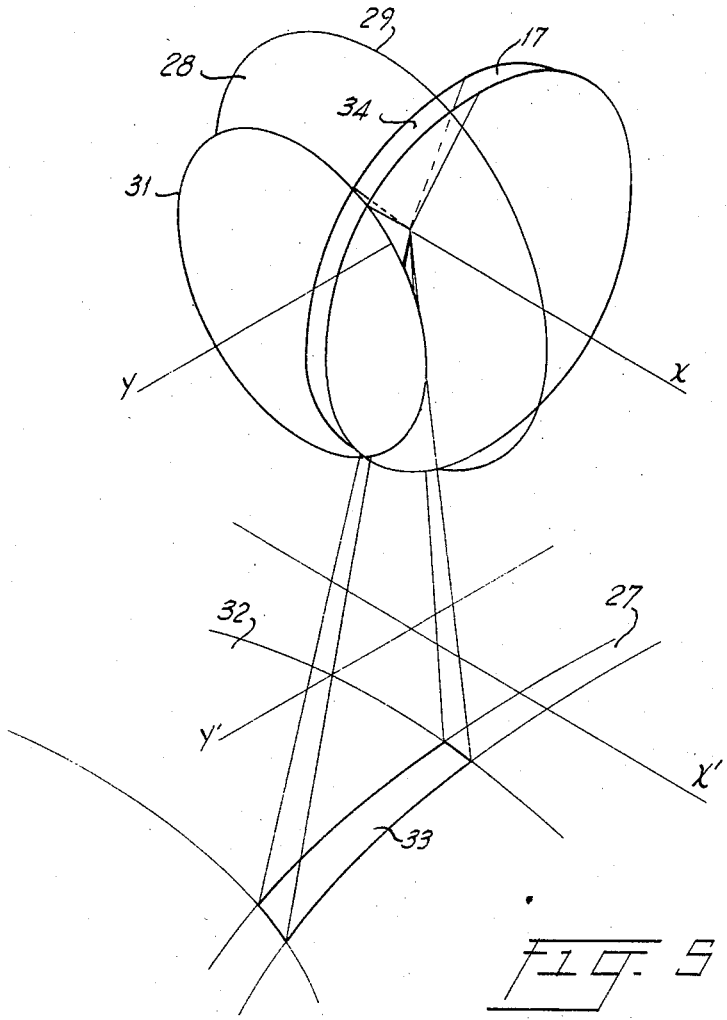
Figure 5 illustrates the irradiation of a restricted spot on a plane by a planar array.

Figures 8 and 11 graphically depict the relative positions and phases of emission to be given elements of a planar array to produce a pair of oblique beams.

Referring now to Fig. 1, a single linear row of two or more identical microwave radiating elements or antennas is represented by the positions 11, 12, 13, 14, 15 and 16 of the radiating elements equally separated by the distance $s$. These radiating elements may be slots, dipoles, or any other known type of radiating element, and the method of feeding energy to them may be various, but for the purpose of illustration the elements are mounted on a rectangular hollow microwave guide 10 and are fed by it. It is convenient to describe the pattern of radiated energy in spherical polar coordinates wherein a direction of radiation AP, Fig. 1, is specified by a polar angle $\gamma$, measured from the array axis X or its complement $\theta$, and by an azimuthal angle $\beta$ measured from a plane of symmetry passing through the array axis. The energization of the elements is so applied as to produce a selected phase difference in the instantaneous emission from adjacent elements, all such phase differences being equal. The phase difference $\delta$ selected for this illustration is $$-\frac{\pi}{2} \text{ radians}$$

the direction of phase progression being taken as in the positive direction of the X-axis, and being shown in Fig. 1 as from left to right. Thus if the leftmost element 11 has at a given instant a phase of zero, the phase of the emission from element 12 at the same instant is $$-\frac{\pi}{2} \text{ radians}$$

that from element 13 is $-\pi$ radians, etc.

In the triangle ABC, angle ACB being a right angle, let it be considered that AC is one-quarter of a wavelength so that radiation leaving element 12 at A reaches the point C one-quarter period later, at which instant radiation of the same phase is leaving element 13 at B. Since this condition of reinforcement is independent of the angle $\beta$, the line BC, and lines parallel to it originating on the other elements of the array, comprise generating lines of a family of conical wave fronts having a direction of propagation at the angle $\theta$ with respect to the ZY plane. Let the sign of $\theta$ be taken positive from the normal to the positive direction of the X-axis. The relation of this angle to the microwave length $\lambda$ that is employed and to the distance $s$ between elements, when the phase difference is as specified, is:

$$\sin \theta = -\frac{\lambda}{4s} P_x \qquad (1)$$

in which $P_x$ is a constant which takes on the value of either plus or minus one according to whether the phase sequence is positive or negative in the X-direction. In this case, following these conventions, a negative sign is required for the right-hand member of the equations, since $\theta$ is positive and $P_x$ has the value $-1$.

Additional lobes or beams may be formed at angles such that the distance AC in Fig. 1 differs from a quarter wavelength by an integral number of wavelengths. Thus, in general, beams will be formed at angles given by $$\sin \theta = P_x \left( -\frac{\lambda}{4s} + \frac{N}{s}\lambda \right) \qquad (2)$$

where N is a positive or negative integer or zero, with the restriction that only values of N which do not produce a value of $\sin \theta$ greater than 1 or less than $-1$ have any significance.

Each beam is characterized by a concentration of radiation in directions making substantially a constant angle with the array axis. The exact distribution of energy as a function of polar angle is determined by the length of the array and by the relative excitation of the elements, and to a very minor extent by the directional pattern of the individual elements.

In an array of similar elements the radiation pattern can be expressed as the product of two factors: the array factor which is determined by the spatial and electrical relationships among the elements, and a factor representing the directional characteristics of a single element.

For purposes of illustration it is convenient to think of the extent of a beam as being limited by rays in directions in which the power radiated per unit solid angle is one half that at the maximum. Adopting this convention, the pattern of the array factor for a linear array, which clearly is symmetrical about the array axis, can be represented as a solid bounded by two coaxial cones, having the same vertex and slightly different vertical angles, as shown in Fig. 2, in which the solid of radiation is indicated at 17. Such a solid will here be termed a conical shell.

The directional pattern of the individual elements is not in general symmetrical about the array axis, both because of the characteristics of the elements themselves and because of reflections from the supporting structure. The complete pattern of an array supported on a guide as depicted in Fig. 1 is the product of the array factor and the pattern of a single element, and is shown in Fig. 3. Also shown in Fig. 3 is the area of ground illumination corresponding to this pattern. The solid figure 18 is the lower part of the solid form 17 of Fig. 2, the rest being eliminated by the interposition of the body of the rectangular guide 10, Fig. 1. The continuation of the solid figure 18 to interception with a plane parallel to the cone axis forms the area of interception 19, which therefore has hyperbolic boundaries.

As an example of one method of constructing such an array, although not limiting the generality of the above description, a rectangular guide may be employed having a single row of 25 similar slotted dipoles equally spaced along the longitudinal center line of one broad face, the spacing $s$, the guide dimensions and the wavelength of the applied microwave energy being so chosen that when the guide is excited from the left end, assuming the position of Fig. 1, there is a phase differential of $$-\frac{\pi}{2} \text{ radians}$$

between the instantaneous emission of each element and that of the next one to the right, which is due to the finite time required for the guided wave to progress from one element to the next.

In order to insure that only one beam is radiated it is necessary to select such a value for $s$ that $\sin \theta$ has a value lying between the limits of $+1$ and $-1$ only in the instance where $N=0$, while for all other values of N, i. e. $+1$ or $-1$ and greater, the value for $\sin \theta$ lies outside of the significant range.

It follows, therefore, that $s$ must be numerically less than $¾\lambda$ in order that only one lobe shall be produced.

In Fig. 4 a number of linear arrays similar to that of Fig. 1 are placed side by side to form a planar array 21, the number that can be employed being two or more. All arrays have the instantaneous phase difference $\delta_x$ of $$-\frac{\pi}{2} \text{ radians}$$

in the direction of the X-axis, and in the Y-axis direction, perpendicular to the X-axis direction, the phases also have the same sequence and difference termed $\delta_y$, reading from top to bottom or in the direction of the Y-axis. Thus the left-most elementary antennas of six linear arrays are indicated at 11, 22, 23, 24, 25 and 26, forming a straight line in the direction of the Y-axis.

The complete assembly can be considered as a linear array whose axis is parallel to the Y-axis and whose elements are themselves linear arrays whose axes are parallel to the X-axis. The complete pattern will be the product of the array factor for the Y-direction linear array and the pattern of the individual X-direction linear arrays. The array factor for the Y-direction array will be represented by a conical shell whose angular width is in inverse proportion to the extent of the array in the Y-direction. The mechanism of production of cones of intensity for the Y-axis case is illustrated by Fig. 1, and Equation 3 which is similar to Equation 1 applies, the distance between elements in the Y-direction being termed $r$ and the constant being termed $P_y$. Equation 3 thus gives the relation between the Y-direction cone normal angle $\phi$ and the parameters.

$$\sin \phi = -\frac{\lambda}{4r} P_y \quad (3)$$

in which $\phi$ is the angle of emission in the Y-direction. Since the phase difference $\delta$ in the X-axis direction and in the Y-axis direction have been made the same, $$\delta_x = \delta_y = -\frac{\pi}{2} \quad (4)$$

Since the phase sequence is negative in each direction, $$P_x = P_y = -1 \quad (5)$$

The number of cones of radiation produced is in accordance with Equation 6, similar to Equation 2, $$\sin \phi = P_y \left( -\frac{\lambda}{4r} + \frac{M}{r}\lambda \right) \quad (6)$$

in which M is a positive or negative integer or zero. In order to radiate only one lobe in the Y-direction $r$ must must be less than $¾\lambda$.

The array factor for the complete planar array is the product of the two linear array factors in the X and Y directions. Each of these linear array factors has been idealized, for purpose of illustration, as a conical shell, i. e., as a function which has the value zero except within the shell. It follows that the product of these two functions, in this idealized representation, is zero except for the region common to both shells. Thus in Fig. 5 the shell 17 of Fig. 2 is shown in isometric projection. If extended it would strike a plane parallel to its X-axis at 27. A similar shell 28 having boundaries at cones 29 and 31 is shown having its axis in the Y-axis direction. If extended it strikes the plane in the hyperbolic area 32. The area of intersection 33 of these hyperbolic strips represents the area illuminated by the composite antenna beam, which is the volume of intersection of the two conical shells 17 and 28. In order for this overlap to occur the shell angles $\theta$ and $\phi$ must have the relation $$\theta + \phi < \frac{\pi}{2} \text{ radians} \quad (7)$$

Ordinarily a second beam, represented by the upwardly projecting volume of intersection 34, is suppressed by the directional characteristics of the elements and reflectors of the component linear arrays. This directionality also modifies slightly the pattern of the downward beam but the effect can usually be neglected.

The isometric representation of beam generation, propagation and interception shown in Fig. 5 is redrawn to a smaller scale in Fig. 6, in which the planar array 36 represents the source of the generated conical solids of radiation 17 and 28 of Fig. 5, and the described area of intersection at plane 37, Fig. 6, is indicated at 33 in both Figures 5 and 6.

In Fig. 1 if $P_x=+1$, that is, if the phase sequence be reversed, the radiation will be concentrated in a beam to the left of the normal instead of to the right and, if applied in Fig. 6, the radiation due to individual linear arrays will fall in a hyperbolic area near the edge 38, and will therefore result because of overlap with the hyperbolic area 32 in an illuminated spot 39. Similarly, if for the linear arrays $P_x=-1$ while for the Y-direction radiation $P_y=+1$, the area 41 will be illuminated, and if $P_x=+1$ and $P_y=+1$ the area 42 will be illuminated.

Let it be supposed that a hypothetical array having the phase relations of Fig. 4 and a similar hypothetical array but having $P_x=+1$ and $P_y=+1$ be superimposed one upon the other so that they occupy exactly the same space, the second array being depicted in Fig. 7. Each will emit its own radiation, the former illuminating the area 33, Fig. 6, and the latter illuminating the area 42.

Inspection of the polarities of the planar arrays of Figs. 4 and 7 discloses that alternate elements in each direction have opposite phases, the remaining elements all having the same phase. Since the net radiation from two elements of equal strength and opposing phase positioned at the same point in space is zero, all of the opposed elements in both planar arrays may be eliminated from the composite array without affecting the emitted radiation. A physical composite array exactly fulfilling the functions of the hypothetical composite array then has the phase difference between alternate elements in both directions of $\pi$ radians, and has staggered spacings. Such a planar array is shown in Fig. 8, which will illuminate both of the areas 33 and 42 of Fig. 6 simultaneously.

A planar array producing a single beam of radiation striking the plane at 39, Fig. 6 and therefore having phase relations defined by $P_x=+1$, $P_y=-1$, is schematically indicated in Fig. 9 with the phases of antenna elements shown. Another similar planar array but having $P_x=-1$ and $P_y=+1$ is shown in Fig. 10 and will illuminate the area 41, Fig. 6. A hypothetical combination of these two arrays is equivalent to the array of Fig. 11, which will therefore produce the illuminations of both, and will simultaneously illuminate areas 39 and 41, Fig. 6.

Comparing the planar arrays of Figs. 8 and 11 the odd horizontal lines are identical but the even horizontal lines differ by having all elements of opposite phase. In each position of these horizontal lines the elements of Fig. 8 are of opposite phase to the respective correspondingly positioned elements of Fig. 11.

The foregoing discussion of planar arrays has been general and not dependent upon any particular method of excitation of the antenna elements or of the linear arrays. In any physical embodiment, however, some form of excitation must be chosen and used. As an example, let it be chosen to excite all of the antenna elements by mounting them on rectangular hollow guides to form a series of linear arrays, each linear array being represented by one of the horizontal lines in Figs. 8 and 11. Let it be assumed that all of the odd-line linear arrays are excited from one source of microwave energy, and that all of the even-line linear arrays are excited from the same or another source of microwave energy through a phase-reversing switch, with the power supplies so correlated that in one position of the switch the relative instantaneous phases of microwave energy emission of the antenna elements are as shown in Fig. 8.

Such a circuit is shown in Fig. 6, in which the planar array 36 consists of five parallel linear arrays 43, 44, 45, 46 and 47. All are excited from a microwave source 48. The odd-numbered rows of linear arrays, 43, 45 and 47, are excited directly but the even-numbered rows 44 and 46 are excited from the source through a phase reversing switch 49 and a phase adjuster 51. In one position of the phase reversing switch 49 the phase adjuster 51 is so adjusted that the element phases are as shown in Fig. 8. The radiated beams are then in the directions 52 and 53 and strike the plane at areas 33 and 42 in opposite quadrants. Upon moving the phase reversing switch to its other position the antenna beams are shifted to their alternate positions shown by the lines 54 and 56, to strike the plane at 39 and 41 in the two remaining quadrants.

In place of reversing the phases of all even linear arrays, the phases of all odd linear arrays can be reversed while holding the phases of the even arrays constant. That this is so is obvious from Figs. 8 and 11. If in Fig. 8 the phase of all odd arrays be reversed, a phase relation identical to Fig. 11 is secured except that a constant of $\pi$ radians is added to the phase of each element. This is equivalent merely to advancing or retarding the phase of the single or coordinated power supply or supplies feeding all elements.

In the planar array 36 the beam sharpness is a function of the length of each array, being proportional to the product of the number of elements and the spacing, as is well understood in the art. This relation holds for the X-direction and also for the Y-direction. The angles $\theta$ and $\phi$ are independently controlled by the spacings $s$ and $r$, respectively, among other factors, as shown by Equations 1 and 3. That is, the spacings $s$ and $r$ need not be equal, and therefore the angles $\theta$ and $\phi$ need not be equal.

What is claimed is:

1. A planar microwave antenna array comprising, a plurality of linear arrays positioned parallel to each other and in the same plane, each of said linear arrays comprising a plurality of radiating elements positioned at selected linear spaced distances, the relative phases of emission of microwave energy from said radiating elements progressively and cyclically varying from element to element by $\pi$ radians over the length of each respective linear array, and the radiating elements of each linear array being offset linearly with respect to the radiating elements of the linear array adjacent thereto.

2. A planar microwave antenna array comprising, a plurality of linear arrays positioned parallel to each other in side by side relation, each of said linear arrays comprising a plurality of radiating elements linearly spaced at selected distances from each other along the length of each linear array, the phase of emission of microwave energy from any individual radiating element being opposite to that of the lineal adjacent radiating elements, and the radiating elements of each linear array being linearly offset with respect to the radiating elements of the linear array immediately adjacent thereto.

3. A planar microwave antenna array comprising, a plurality of linear arrays positioned parallel to each other and in side by side relation, each of said linear arrays comprising a plurality of radiating elements linearly spaced at selected distances from each other along the length of each linear array, the phase of emission of microwave energy from any individual radiating element being opposite to that of the lineal adjacent radiating elements, and the radiating elements of each linear array being linearly offset with respect to the radiating elements of an immediately adjacent linear array by an amount equal to one half the selected distances of linear spacing.

4. A planar microwave antenna array comprising, a structure adapted to be energized by microwave energy carrying a plurality of individual radiating elements arranged in a plurality of rows and a plurality of columns, the spacing between adjacent individual radiating elements in the several rows being a uniform selected distance and the spacing between columns being one half said selected uniform distance whereby the radiating elements in adjacent rows are in staggered relation to each other, means for energizing the radiating elements so that the instantaneous phase of emission of each individual element is opposite to the instantaneous phase of emission of the adjacent radiating elements in the same row and is likewise opposite to the instantaneous phase of emission of the adjacent radiating elements in the same column.

5. A planar microwave antenna radiating system comprising, a structure adapted to be energized by microwave energy carrying a plurality of individual radiating elements arranged in a plurality of rows and a plurality of columns, the spacing between adjacent individual radiating elements in the several rows being a uniform selected distance and the spacing between columns being one half said selected uniform distance whereby the radiating elements in adjacent rows are in staggered relation to each other, means for energizing the radiating elements so that the instantaneous phase of emission of each individual element is opposite to the instantaneous phase of emission of the adjacent radiating elements in the same row, and is likewise opposite to the instantaneous phase of emission of the adjacent radiating elements in the same column, and means for simultaneously reversing the instantaneous phases of emission of all of the radiating elements comprised in alternate rows.

6. A planar microwave antenna radiating system comprising, a plurality of linear wave guide arrays positioned parallel to each other in side by side relation, each of said linear arrays including a plurality of radiating elements spaced at equal selected distances along the length of said array, the radiating elements of adjacent linear arrays being linearly displaced with respect to each other by an amount equal to one half said selected distance, means for impressing microwave energy on said linear wave guide arrays, said radiating elements being so oriented as respects said impressed microwave energy that the instantaneous phase of emission of any individual radiating element is opposite to that of the adjacent radiating elements in the same linear array and opposite to the instantaneous phase of emission of similarly lineal positioned radiating elements in the next alternate linear arrays, and means for simultaneously reversing the instantaneous phases of emission of all the radiating elements comprised in alternate linear arrays.

References Cited in the file of this patent

UNITED STATES PATENTS

| | | |
|---|---|---|
| 1,738,522 | Campbell | Dec. 10, 1929 |
| 2,245,660 | Feldman et al. | June 17, 1941 |
| 2,409,944 | Loughren | Oct. 22, 1946 |
| 2,605,413 | Alvarez | July 29, 1952 |

FOREIGN PATENTS

| | | |
|---|---|---|
| 137,221 | Australia | May 15, 1950 |